(12) United States Patent
Miwa et al.

(10) Patent No.: US 7,658,497 B2
(45) Date of Patent: Feb. 9, 2010

(54) ROD INTEGRATOR HOLDER AND PROJECTION TYPE VIDEO DISPLAY

(75) Inventors: Takashi Miwa, Osaka (JP); Nobuyuki Kondou, Osaka (JP); Yoshihiro Yokote, Osaka (JP)

(73) Assignee: Sanyo Electric Co., Ltd, Moriguchi (JP)

( * ) Notice: Subject to any disclaimer, the term of this patent is extended or adjusted under 35 U.S.C. 154(b) by 568 days.

(21) Appl. No.: 11/648,554

(22) Filed: Jan. 3, 2007

(65) Prior Publication Data
US 2008/0079912 A1    Apr. 3, 2008

(30) Foreign Application Priority Data
Jan. 11, 2006    (JP)    ............................. 2006-004112

(51) Int. Cl.
*G03B 21/14*    (2006.01)
(52) U.S. Cl. .......................................... 353/20; 385/40
(58) Field of Classification Search ................... 353/98, 353/99, 20; 385/133, 901, 43, 50; 362/585, 362/555
See application file for complete search history.

(56) References Cited
U.S. PATENT DOCUMENTS
7,230,774 B2 *    6/2007    Suzuki et al. ............... 359/726

FOREIGN PATENT DOCUMENTS
JP    2004-094115    3/2004

* cited by examiner

*Primary Examiner*—Diane I Lee
*Assistant Examiner*—Jerry Brooks
(74) *Attorney, Agent, or Firm*—NDQ&M Watchstone LLP (57) ABSTRACT

A guide convex portion is formed on a base plate in parallel to an illumination optical axis. Further, a fixed-side supporting member is provided in the base plate. A first opening is formed in an upright portion of the fixed-side supporting member. A slide supporting member can be provided on the base plate. A second opening is formed in the upright portion of the slide supporting member. By inserting a tapered rod into the second opening at its light incidence side and by moving the slide supporting member along the aforementioned guide convex portion, the slide supporting member is stopped at a predetermined position and, at this position, the slide supporting member is fixed.

4 Claims, 10 Drawing Sheets

ROD INTEGRATOR HOLDER AND PROJECTION TYPE VIDEO DISPLAY

BACKGROUND OF THE INVENTION

1. Field of the Invention

The present invention relates to a rod integrator holder for holding a tapered rod integrator and a projection type video display including the same.

2. Description of Related Art

In recent years, attempts have been made to mount, on projection type video display, an illuminating system employing tapered rod integrators for reducing the divergence angles of light emitted from light sources such as LEDs and for reducing the luminance non-uniformity within the light illumination surfaces. Further, there have been proposed rod integrator holders for holding the tapered rod integrators (refer to Japanese Unexamined Patent Publication No. 2004-94115).

SUMMARY OF THE INVENTION

However, conventional rod integrator holders as aforementioned may cause inconvenience such as disagreement of the optical axis center of the tapered rod integrator with the illumination optical axis, in cases where sufficient accuracy of the shape of the tapered rod integrator is not ensured. Further, conventional rod integrator holders as aforementioned have holding portions for holding the tapered rod integrator at two portions, which are the light exit side and the light incidence side thereof, thereby holding the tapered rod integrator with these two holding portions. However, it can be considered that ensuring the accuracy of the aforementioned conventional rod integrator holder is not easy, because the aforementioned two holding portions are obtained by working on the inside of a tubular member.

In view of the aforementioned circumstances, it is an object of the present invention to provide a rod integrator holder which enables ensuring the machining accuracy of the rod integrator holder itself relatively easily and also making the optical axis center of a tapered rod integrator coincident with an illumination optical axis as much as possible, even when sufficient machining accuracy of the shape of the tapered rod integrator is not ensured.

In order to address the above problem, the present invention provides a rod integrator holder for positioning and holding a tapered rod integrator having a light incidence surface and a light exit surface, one of which is larger than the other, the rod integrator holder comprising: a fixed-side supporting member having a first holding portion with a first opening for positioning and holding said larger surface side thereof a guide portion formed in parallel to an illumination optical axis; and a slide supporting member provided movably along said guide portion, wherein said slide supporting member has a second holding portion with a second opening corresponding to a shape and a size of a halfway portion of the body portion of said tapered rod integrator, so that the halfway portion of said body portion is positioned and held through said second opening at the position of the halfway portion of said body portion.

The aforementioned rod integrator holder is constituted by the fixed-side supporting member having the first holding portion, the guide portion and the second holding portion having the second opening, which eliminates the necessity of forming rod holding portions by working on the inside of a tubular member as in a conventional rod integrator holder, thereby enabling ensuring the accuracy of the rod integrator holder itself relatively easily. Furthermore, the aforementioned slide supporting member is slidable in parallel to the illumination optical axis by the aforementioned guide portion, and the aforementioned tapered rod integrator is positioned and held at the halfway position of the body portion thereof through the second opening of the slide supporting member. This enables making the optical axis center of the tapered rod integrator coincident with the illumination optical axis as much as possible and also preventing the occurrence of wobbles in the aforementioned holding as much as possible, even when sufficient accuracy of the shape of the tapered rod integrator is not ensured.

The above rod integrator holder may be configured such that said fixed-side supporting member holds one end of another rod-type optical integrator or one end of a prism that changes the optical path by a predetermined angle.

The rod integrator holder of the above configurations may be configured such that said fixed-side supporting member holds a polarization conversion device for aligning a direction of polarization of light emitted from said tapered rod integrator.

Moreover, a projection type video display of the present invention may include: a light source; a tapered rod integrator to which light emitted from said light source incidents; a rod integrator holder according to any one of the rod integrator holders for holding said tapered rod integrator; a light valve for modulating light directed thereto; and a projection portion for projecting image light from said light value.

The rod integrator holder according to the present invention eliminates the necessity of forming rod holding portions by working on the inside of a tubular member as in a conventional rod integrator holder, thereby enabling ensuring the accuracy of the rod integrator holder itself relatively easily. This enables making the optical axis center of the tapered rod integrator coincident with the illumination optical axis as much as possible, even when sufficient accuracy of the shape of the tapered rod integrator is not ensured. This offers the advantage of not requiring assembly-workers to have specific skills for making the optical axis center of the tapered rod integrator coincident with the optical axis center of the illuminating system as much as possible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, with reference to FIGS. 1 to 14, an embodiment of the present invention will be described.

Figure 1:
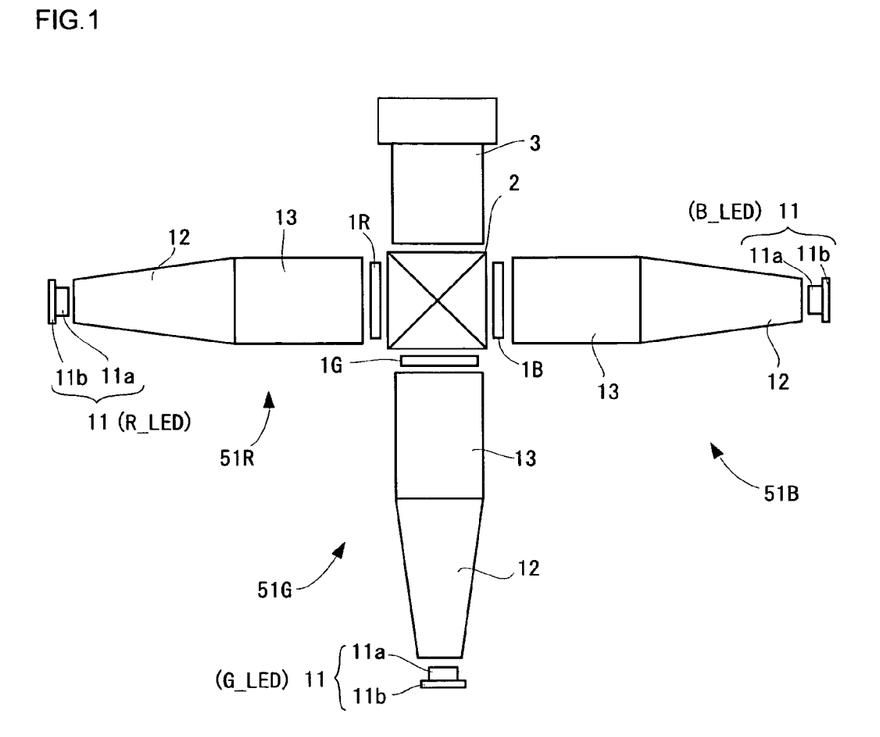
FIG. 1 is an explanation view illustrating an optical system in a projection type video display according to an embodiment of the present invention.

FIG. 1 is an explanation view illustrating an optical system in a projection type video display. This projection type video display includes three illuminating devices 51R, 51G and 51B. Each illuminating device 51 includes an LED (light-emitting diode) 11 as a light source, a tapered rod integrator (hereinafter, referred to as a tapered rod) 12, and a rectangular-parallelepiped rod integrator (hereinafter, referred to as an extension rod) 13. Further, at the light exit side of each illuminating device 51, there is placed a liquid crystal display panel 1R, 1G or 1B as a light valve.

The aforementioned LED 11 is constituted by an LED chip 11a and a heat sink (heat releasing plate) 11b. The LED chip 11a in the illuminating device 51R emits red light, the LED chip 11a in the illuminating device 51G emits green light, and the LED chip 11a in the illuminating device 51B emits blue light.

The respective color lights emitted from the illuminating devices 51 are passed through the liquid crystal display panels 1R, 1G and 1B for the respective colors to create the respective color image lights. Then, the respective color image lights are combined with one another through a cross dichroic prism 2 (or a cross dichroic mirror) to form a full-color image light. This full-color image light is projected through a projection lens 3.

The aforementioned liquid crystal display panels 1R, 1G and 1B have an aspect ratio of 4:3 or 16:9, for example. The light exit surface of the extension rod 13 can have an aspect ratio equal to or approximately equal to that of the aforementioned liquid crystal display panels 1R, 1G and 1B. Further, the light exit surface of the tapered rod 12 can have an aspect ratio equal to or approximately equal to that of the light incidence surface of the extension rod 13. The aforementioned tapered rod 12 can be tapered at its four surfaces forming its entire side surfaces or can be tapered at two surfaces out of them (while the other two surfaces can be parallel to each other). If the tapered rod 12 is tapered at the aforementioned four surfaces, the light exit surface and the light incidence surface of the tapered rod 12 can have the same aspect ratio. If the tapered rod 12 is formed with excellent machining accuracy, the line connecting the center of the light exit surface of the tapered rod 12 and the center of the light incidence surface thereof to each other is coincident with the optical axis of the tapered rod 12 and, also, the aforementioned light exit surface and the light incidence surface are orthogonal to the aforementioned optical axis.

Figure 2:
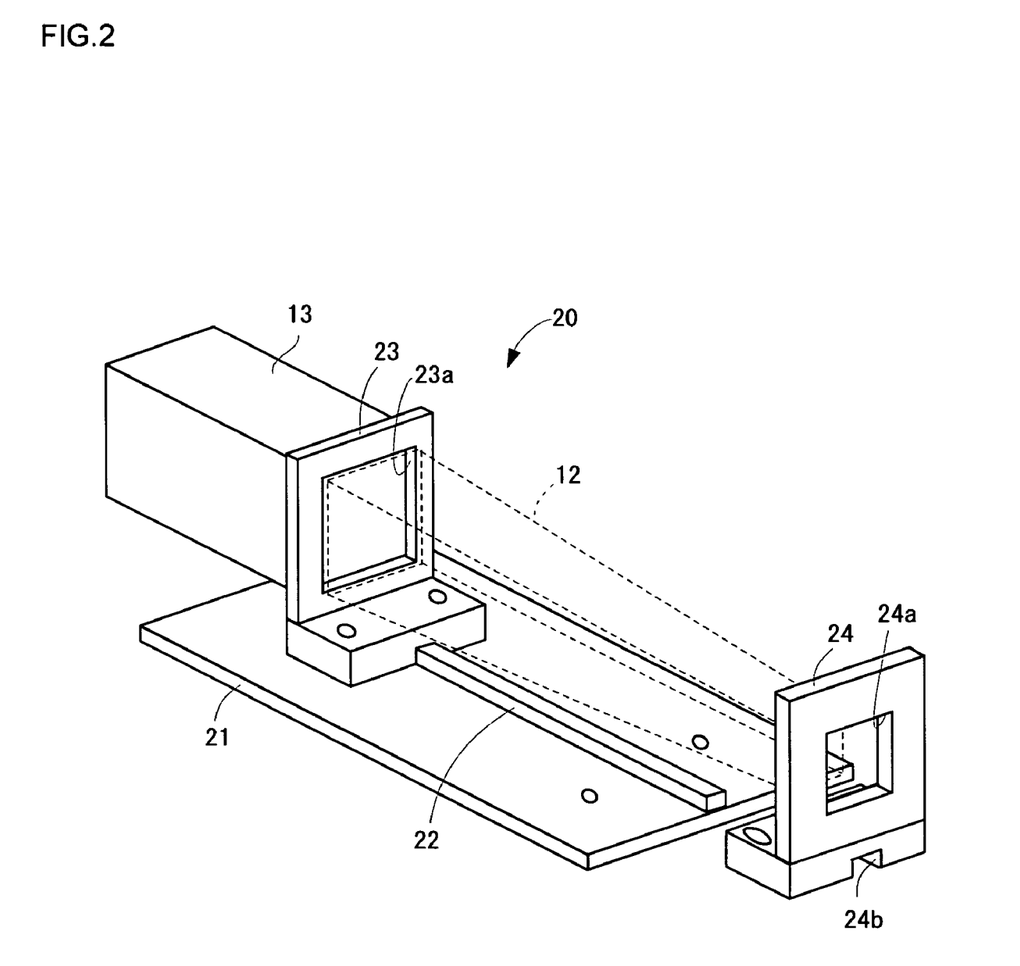
FIG. 2 is a perspective view illustrating a rod integrator holder according to the embodiment of the present invention.
Figure 3:
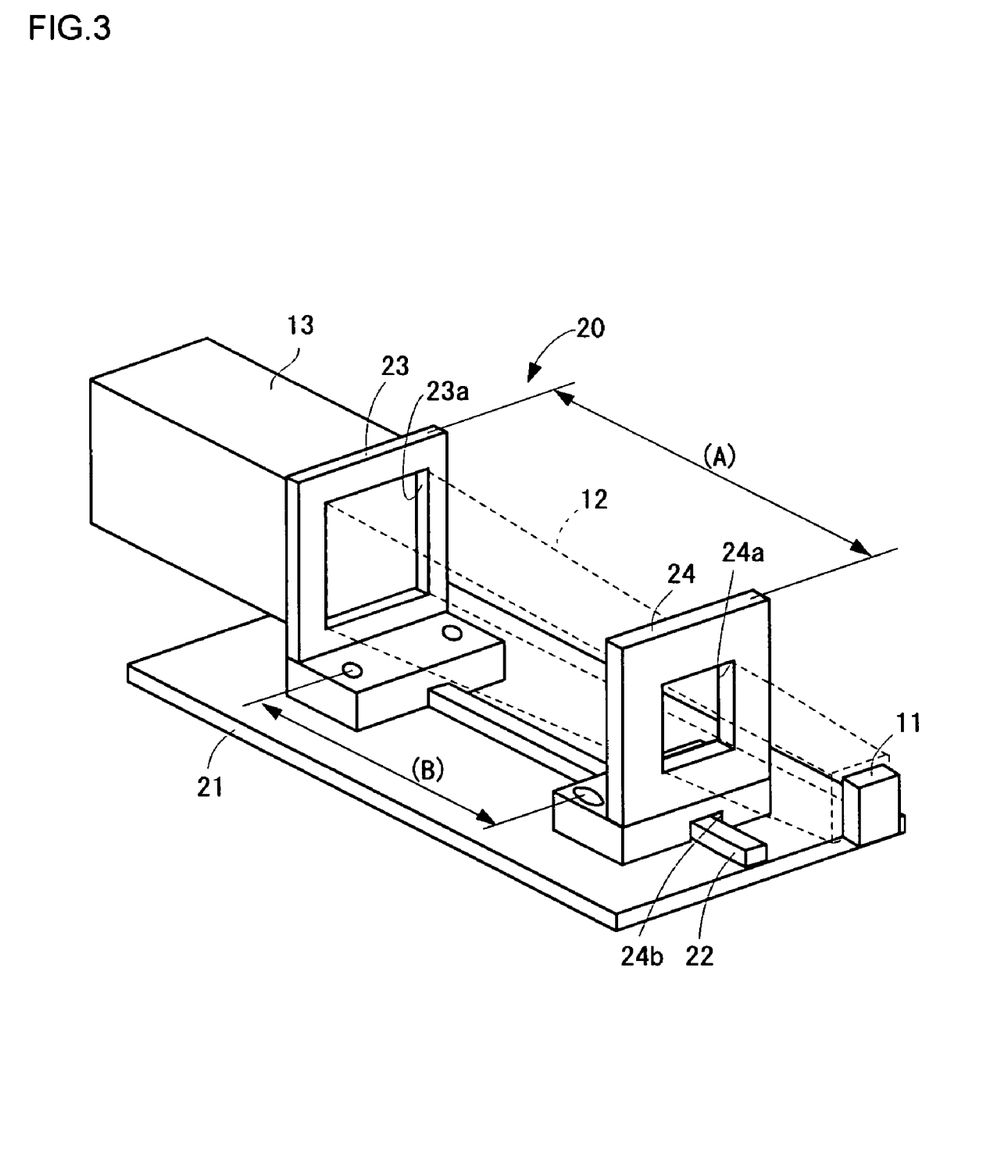
FIG. 3 is a perspective view illustrating the rod integrator holder illustrated in FIG. 2 in which a slide supporting member is mounted.

FIGS. 2 and 3 are perspective views illustrating a rod integrator holder 20. On a base plate 21, there is formed a guide convex portion 22, in the direction parallel to the illumination optical axis in the illuminating device 51. Further, on the aforementioned base plate 21, there is provided a fixed-side supporting member 23. The fixed-side supporting member 23 has substantially an L-shaped cross-sectional area, and a first opening 23a is formed at the upright portion (the first holding portion) thereof. Further, screw insertion holes are formed at the base portion of the fixed-side supporting member 23. Screws can be inserted into screw holes formed on the base plate 21, through the screw insertion holes. The aforementioned screws can be threadably engaged with the aforementioned screw holes to secure the fixed-side supporting member 23 to the base plate 21.

Figure 4:
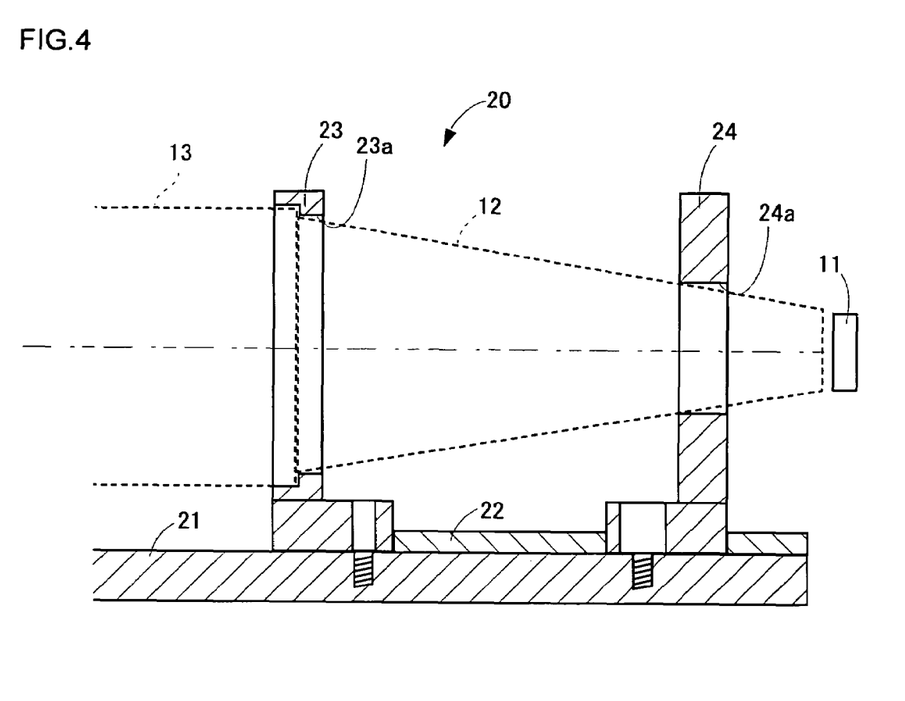
FIG. 4 is a cross-sectional view of the rod integrator holder illustrated in FIG. 2.

The aforementioned first opening 23a is coincident or substantially coincident, in shape and size, with the light exit surface (the larger surface) of the tapered rod 12 and with the light incidence surface of the extension rod 13. For example, in cases where the light incidence surface of the extension rod 13 is made greater than the light exit surface of the tapered rod 12 in some degree, as illustrated in FIG. 4, in correspondence with this, a larger opening portion and a smaller opening portion are formed in the aforementioned first opening 23a to form a step portion. This step portion functions as a butting portion (stopper) for the light incidence surface of the extension rod 13. As a matter of cause, the extension rod 13 can be directly contacted with the tapered rod 12 by not providing the aforementioned step portion. Also, the aforementioned first opening 23a is formed to have an opening shape which forms a measure of gap between the extension rod 13 and the tapered rod 12, more specifically a shape having a stopper portion which butts against the edge portion of the light exit surface of the tapered rod 12 so that they do not contact with each other. Further, it is also possible to interpose an optical device having a shape corresponding to the edge portion of a single-convex lens, for example, at a portion facing to the vicinity of the edge of the light exit surface of the tapered rod 12. The aforementioned optical device may be adhered to the tapered rod 12 with a transparent adhesive.

A slide supporting member 24 can be placed on the base plate 21. The slide supporting member 24 has substantially an L-shaped cross-sectional area, and a second opening 24a is formed at the upright portion (a second holding portion) thereof. Further, at the center of the bottom surface of the base portion of the slide supporting member 24, there is formed a guide concave portion 24b which is guided by the aforementioned guide convex portion 22. It is preferable that the occurrence of wobble in the fitting between the guide convex portion 22 and the guide concave portion 24b is restrained as much as possible. At the state where the slide supporting member 24 is guided through the guide concave portion 24b, the upright portion (the second holding portion) thereof and the upright portion (the first holding portion) of the fixed-side supporting member 23 are faced to each other in parallel. Further, screw insertion holes with an elongate-hole shape are formed at the base portion of the slide supporting member 24. Screws can be inserted into screw holes formed in the base plate 21, through the aforementioned screw insertion holes. The aforementioned screws can be threadably engaged with the aforementioned screw holes to secure the slide supporting member 24 to the base plate 21.

The second opening 24a has a shape greater than the light incidence surface of the tapered rod 12, but smaller than the light exit surface thereof. Further, the second opening 24a has a shape and a size which conform to the cross-sectional shape of a halfway portion of the body portion of the tapered rod 12. The line connecting the center of the second opening 24a and the center of the first opening 23a to each other (hereinafter, referred to as an opening center line) is parallel to the line in the direction of the guiding of the guide convex portion 22. A plane of the first opening 23a (opening plane) and a plane of the second opening 24a (opening plane) are perpendicular to the line in the direction of the guiding of the guide convex portion 22. Further, a plane including both the aforementioned opening center line and the aforementioned line in the direction of guiding is perpendicular to the base plate 21. By inserting the tapered rod 12 into the second opening 24a at its light incidence side and by moving the slide supporting member 24 along the aforementioned guide convex portion 22, the slide supporting member 24 is stopped at a predetermined position, as illustrated in FIG. 3 (the slide supporting member 24 is prevented from sliding). Further, the aforementioned screw holes are formed in the aforementioned base plate 21 in agreement with the stop position. However, in anticipation of the occurrence of errors, the screw insertion holes with the elongate-hole shape are formed in the slide supporting member 24, as previously described.

Figure 5:
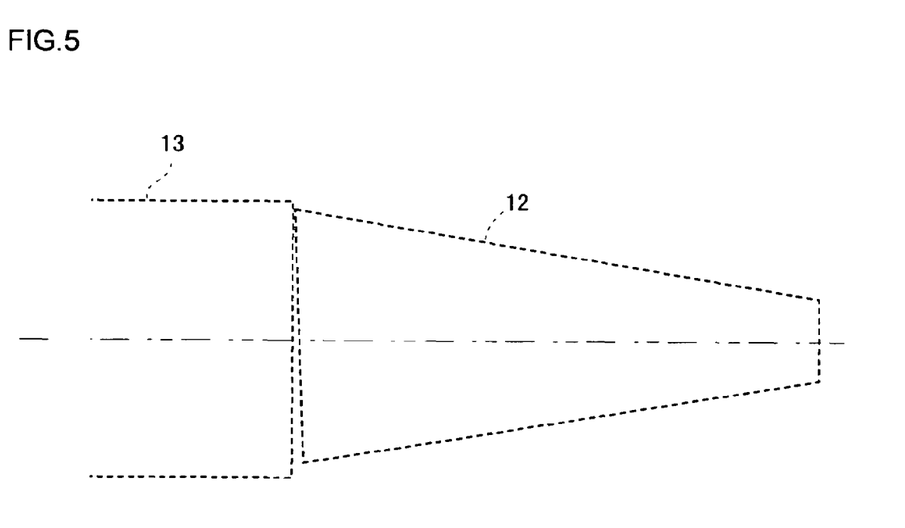
FIG. 5 is an explanation view illustrating a case where a tapered rod with poor machining accuracy must be placed such that its light exit surface is inclined with respect to the light incidence surface of an extension rod.

On the other hand, in cases where the tapered rod 12 is formed with poor machining accuracy, for example, if the light exit surface of the tapered rod 12 is not orthogonal to the optical axis thereof, the tapered rod 12 must be placed such that the light exit surface thereof is oblique with respect to the light incidence surface of the extension rod 13, as illustrated in FIG. 5. That is, if the oblique arrangement of the tapered rod 12 is not performed, it is impossible to make the optical axis of the tapered rod 12 coincident with the optical axis of the extension rod 13.

Figure 6:
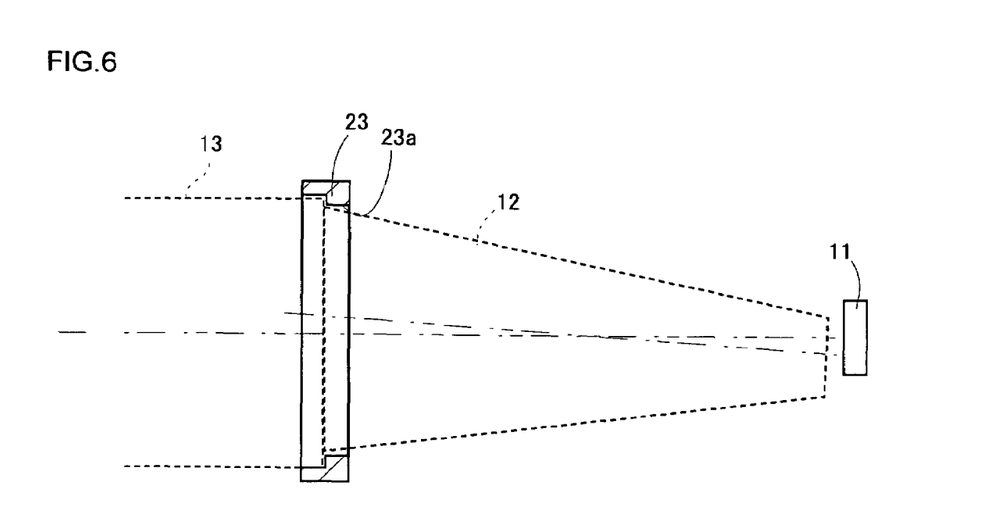
FIG. 6 is an explanation view illustrating a case where the optical axis of the tapered rod is not coincident with the optical axis of the extension rod, since the tapered rod is placed such that its light exit surface is in contact with the light incidence surface of the extension rod, in a case shown in FIG. 5.
Figure 7:
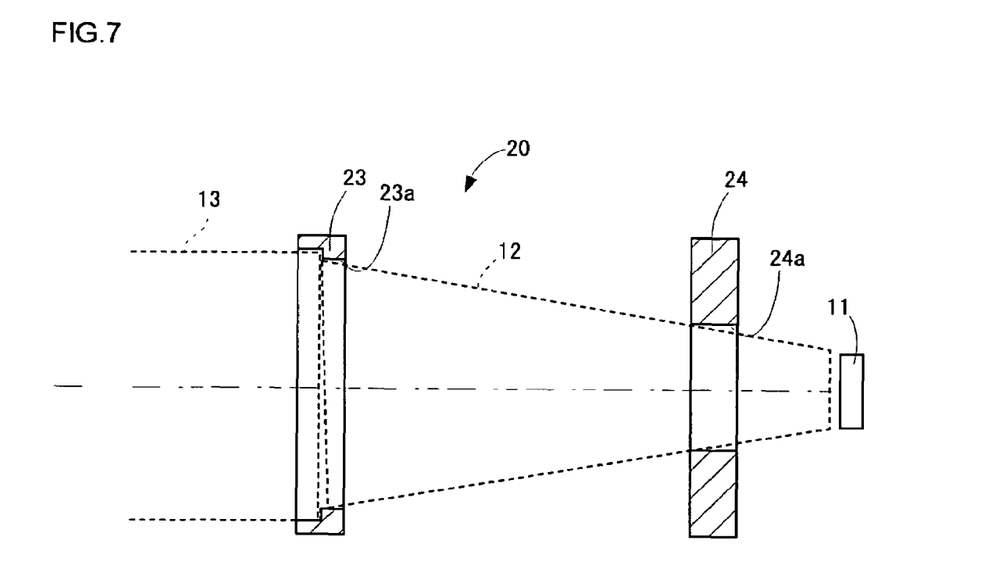
FIG. 7 is an explanation view illustrating that the optical axis of the tapered rod can be coincident with the optical axis of the extension rod by the use of the rod integrator holder of FIG. 2, even when the light exit surface of the tapered rod is not orthogonal to the optical axis thereof, in a case shown in FIG. 5.

If the tapered rod 12 is assembled in such a way as to place the light exit surface thereof in contact with the light incidence surface of the extension rod 13, as illustrated in FIG. 6, it is impossible to make the optical axis of the tapered rod 12 coincident with the optical axis of the extension rod 13. On the other hand, with the configuration capable of guiding the slide supporting member 24 through the guide convex portion 22, the tapered rod 12 can be positioned while the side surfaces of the tapered rod 12 are pushed in the leftward and rightward directions (in the vertical direction to the direction of guiding) in the aforementioned second opening 24a with reference to the guide convex portion 22, as illustrated in FIG. 7, even when the light exit surface of the tapered rod 12 is not orthogonal to the optical axis thereof. This enables making the optical axis of the tapered rod 12 coincident with the optical axis of the extension rod 13. Further, if there are some variations in the tapering angle, the rod integrator holder in Japanese Unexamined Patent Publication No. 2004-94115 described above may cause wobbles or changes in the distance between the light incidence surface of the tapered rod and the LED, while the rod integrator holder according to the present application will cause only changes in the stop position of the slide supporting member 24 in some degree, without causing the aforementioned problems of conventional rod integrator holder. In other words, it can be considered that, if a sufficient machining accuracy of the tapered rod 12 is ensured, the extension rod 13 and the tapered rod 12 can be adhered to (integrated with) each other by a transparent adhesive and, then, they can be placed within the projection type video display. However, in order to compensate for the aforementioned optical axis deviation in cases where the machining accuracy of the tapered rod 12 is insufficient, it is desirable to employ the configuration that the tapered rod 12 and the extension rod 13 are placed in the projection type video display, without adhering them to each other. Further, with the configuration of the present application, it is possible to ensure the accuracy of the rod integrator holder itself relatively easily, in comparison with the conventional rod integrator holders.

Figure 8:
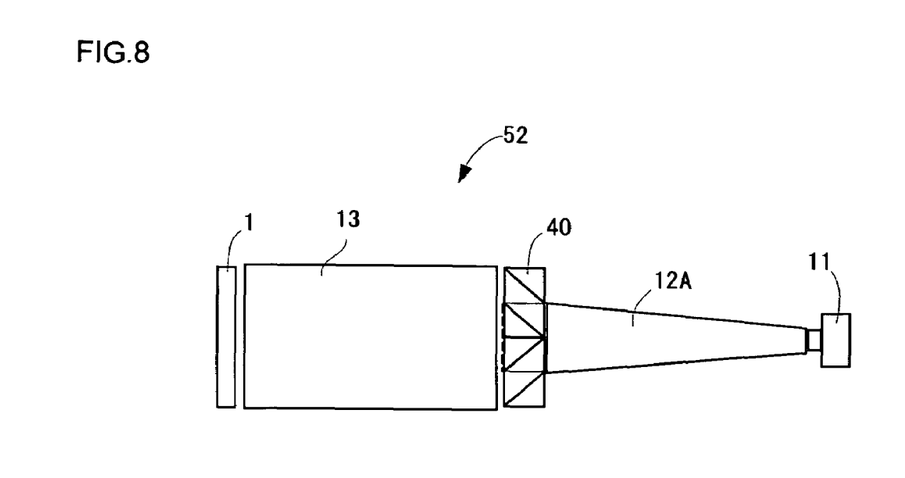
FIG. 8 is an explanation view illustrating another example of an illuminating device.

FIG. 8 is an explanation view illustrating another illuminating device 52. The illuminating device 52 includes a polarization conversion device 40 between a tapered rod 12A and the extension rod 13. The polarization conversion device 40 has a structure which disposes two polarization beam splitters or a structure which disposes one polarization beam splitter and a reflecting member for reflecting light from the aforementioned polarization beam splitter. Then, a retardation plate (½λ plate) is provided either on a light emission side of one polarization beam splitter or on the light emission side of the reflecting member, and a polarization direction is aligned by converting one polarized light to the other polarized light. The shape of the tapered rod 12A corresponds to the shape of the tapered rod 12 whose light exit surface is a substantially half size in a predetermined direction (the lateral size, in this example).

Figure 9:
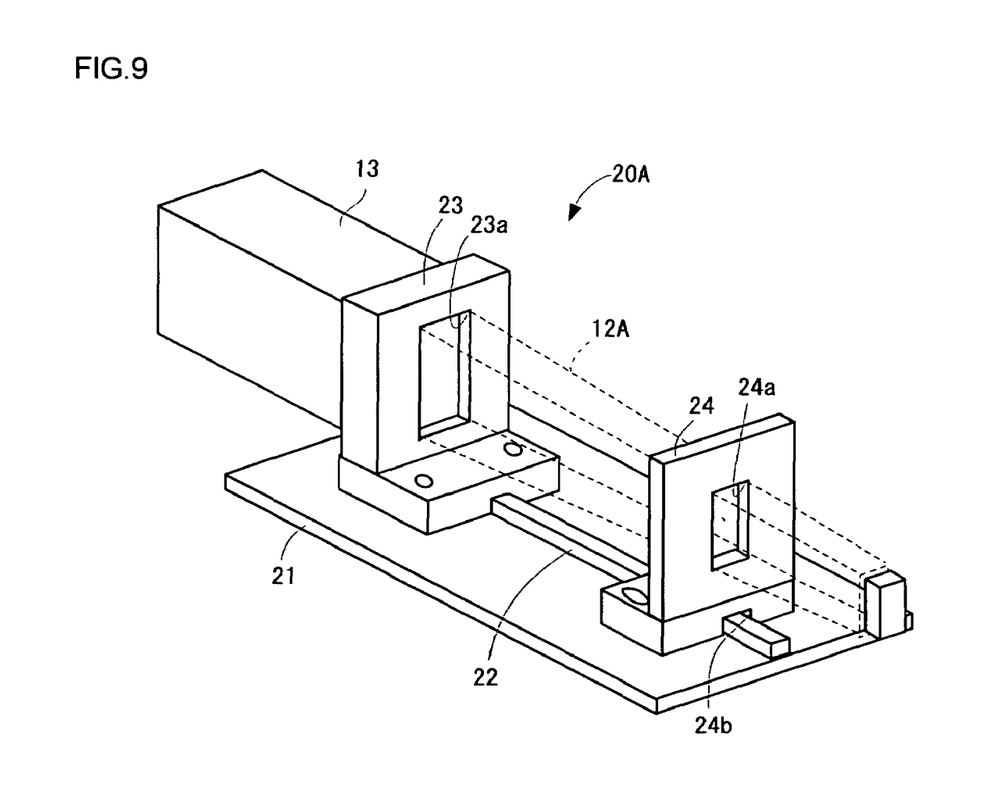
FIG. 9 is a perspective view illustrating a rod integrator holder adaptable to the illuminating device illustrated in FIG. 8.
Figure 10:
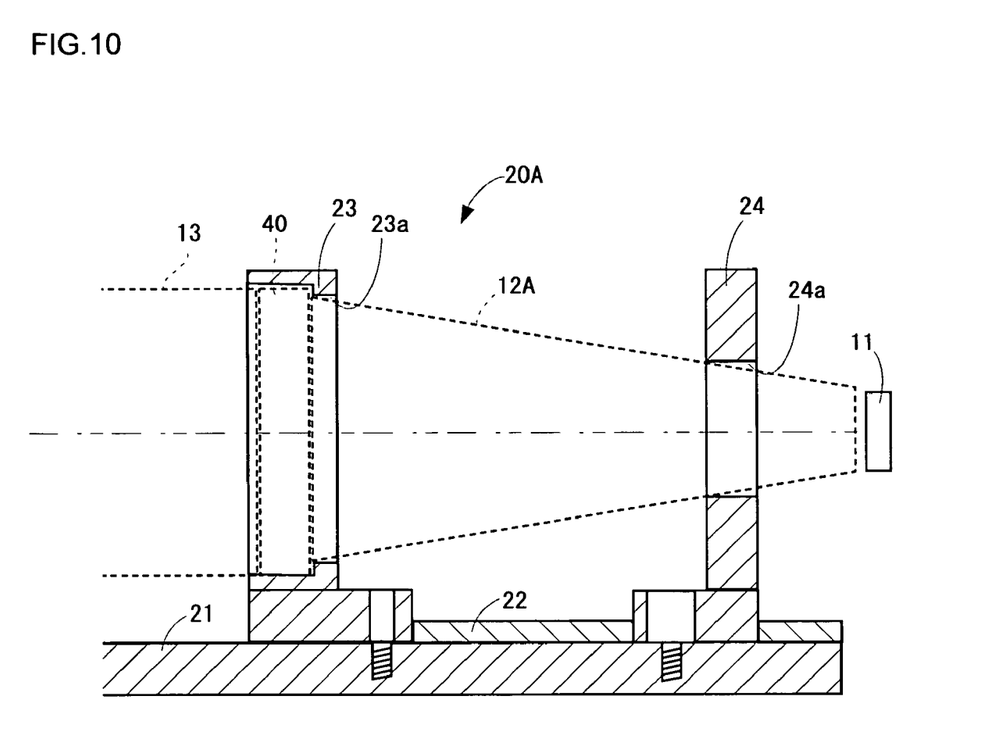
FIG. 10 is a cross-sectional view of the rod integrator holder illustrated in FIG. 9.

FIG. 9 is a perspective view illustrating a rod integrator holder 20A in the aforementioned illuminating device 52. The rod integrator holder 20A has the same basic configuration as that of the aforementioned rod integrator holder 20. FIG. 10 is a cross-sectional view of the rod integrator holder 20A. The fixed-side supporting member 23 in the rod integrator holder 20A has a thickness greater than that of the fixed-side supporting member 23 in the rod integrator holder 20, and a larger opening portion of a first opening 23a has a thickness (depth) greater than that of the polarization conversion device 40. In the larger opening portion, the polarization conversion device 40 is held and, also, the light incidence surface of the extension rod 13 is supported. It should be noted that, in this configuration, it can be considered that, similarly, the tapered rod 12A and the polarization conversion device 40 and even the extension rod 13 can be adhered to (integrated with) one another by a transparent adhesive and, then, they can be placed within the projection type video display (in cases where the machining accuracy of these optical devices is sufficient). However, in order to compensate for the aforementioned optical axis deviation in cases where the machining accuracy of the tapered rod 12 and the like are insufficient, it is preferable to employ the configuration that these optical devices (the rod and the like) are placed in the projection type video display without adhering them to one another.

It should be noted that the slide supporting member 24 can be made of a material such as a resin or a metal having a hardness lower than the material of the tapered rod 12 (for example, a glass) and also having heat resistance (it is only required to withstand the temperature of the tapered rod 12 which is raised by the light source being lighted). As a matter of cause, it is not intended to exclude configurations which employ a slide supporting member 24 having a hardness greater than that of the material of the tapered rod 12 (for example, a glass). Also, the upright portion of the slide supporting member 24 can have elasticity (thickness) enough to incline (deform) in the direction of expansion of the tapered rod 12, if the tapered rod 12 is expanded toward the LED 11 due to its thermal expansion, and also to be restored (returned from the inclined state) after the tapered rod 12 is contracted (returned to the original state).

Figure 11:
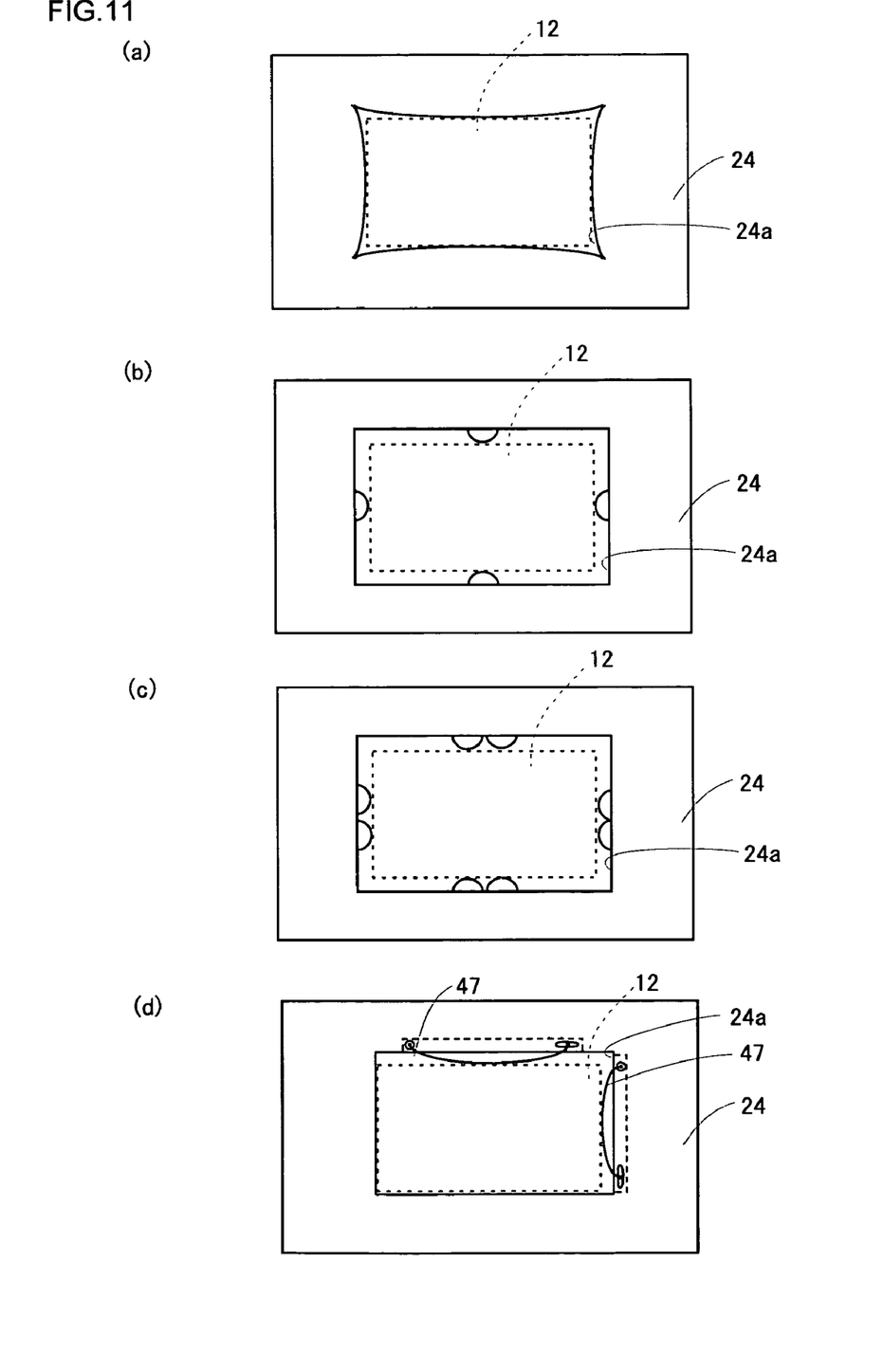
FIG. 11 is an explanation view illustrating another example of shapes of a second opening in a slide supporting member.

Further, while, there has been exemplified a case where the second opening 24a has a shape and a size which conform to the cross-sectional shape of a halfway portion of the body portion of the tapered rod 12, as an example where the second opening 24a has a shape and a size which correspond to the cross-sectional area of a halfway portion of the body portion of the tapered rod 12 (12A), the present invention is not limited thereto. In order to reduce the optical loss in the tapered rod 12 (12A), it is desirable to provide a smallest possible contact area between the tapered rod 12 (12A) and the second opening 24a. By supporting the tapered rod 12 (12A) through the second opening 24a with line-support (line-contact) or point-support (point-contact), it is possible to maintain the reflection characteristics within the tapered rod 12 (12A) more preferably, than by supporting it with surface-support. Accordingly, the second openings 24a shaped to have curved portions or convex portions (which are not limited to a half-round shape) for supporting the tapered rod 12 (12A) with point-support manner, as illustrated in FIGS. 11(a) to (c), are also included in the second opening having a shape and a size corresponding to the cross-sectional shape of a halfway portion of the body portion of the tapered rod 12 (12A). This can be applied to the first opening 23a. FIG. 11(d) illustrates an example of a configuration which supports, with point-support manner, the side surfaces of a halfway portion of the body portion of the tapered rod 12 by arc-shaped blade springs 47 which correspond to the aforementioned curved portions or convex portions. In this case, the second opening 24a itself is formed to be larger than the aforementioned halfway portion of the body portion. Further, the aforementioned blade springs 47 having a sufficient hardness (greater rigidity) is employed, in view of supporting the tapered rod 12 at the four side surfaces thereof in a fixing manner (supporting it at the four side surfaces thereof in a non-elastic manner). On the other hand, the aforementioned blade springs should have the hardness that they deform (withdraw) on receiving forces caused by thermal expansion of the tapered rod 12. The second opening 24a having the springs in FIG. 11(d) is also included in the second opening having a shape and a size corresponding to the cross-sectional shape of a halfway portion of the body portion of the tapered rod 12 (12A).

As a matter of cause, the tapered rod 12 (12A) is not limited to a tapered rod shaped to have a rectangular-shaped cross-sectional area, but may be a tapered rod having an octagonal shape formed by cutting the four corners of such a rectangular shape or other shapes. Further, the tapered rod is not limited to a tapered rod made of a transparent material (a glass or the like), but may be a tapered rod having a hollow configuration (with mirror surfaces at its inner surfaces).

Figure 12:
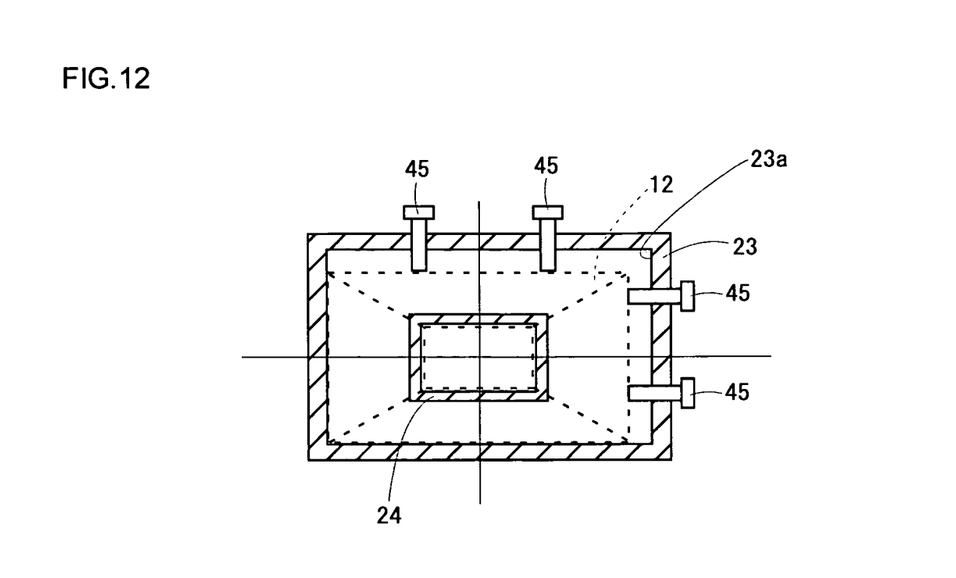
FIG. 12 is an explanation view illustrating the configuration capable of holding, by screws, the larger surface side of the tapered rod.
Figure 13:
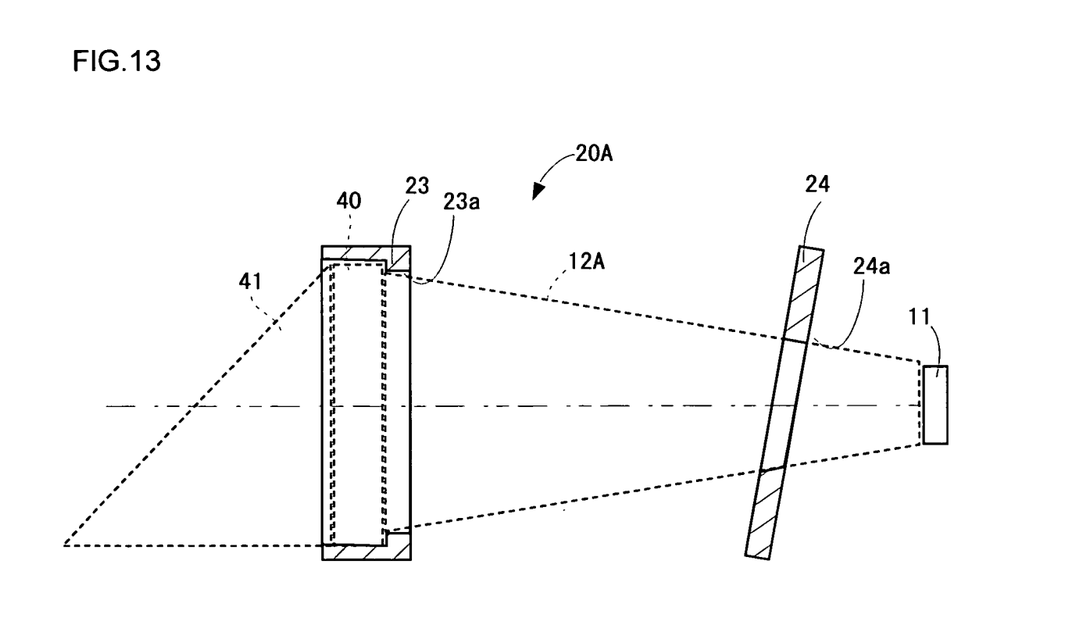
FIG. 13 is an explanation view illustrating a case of holding a prism with the fixed-side supporting member.

Further, the fixed-side supporting member 23 can be provided with a mechanism for securing the aforementioned tapered rod 12 (12A), the extension rod 13 and also the polarization conversion device 40. For example, as illustrated in FIG. 12, the larger surface (the light exit surface) of the tapered rod 12 can be pressed with screws 45 at side portions thereof. In this case, the first opening 23a is formed to be larger than the aforementioned larger surface, and the left-side edge and the lower edge of the first opening 23a in FIG. 12 function as a reference surface for positioning of the aforementioned larger surface. Further, in this case, the line connecting the centers of the first opening 23a and the second opening 24a to each other (the opening center line) is deviated, in some degree, from the line connecting the center of the light exit surface of the aforementioned tapered rod 12 (12A) and the center of the light incidence surface thereof to each other (the rod center line). It this case, it is desirable to form a guide convex portion 22 just under the rod center line at the position at which the tapered rod 12 should be placed (the positioning position) in the design. It should be noted that in order to prevent the screws 45 from excessively pressing the tapered rod 12, for example, elastic members (coil springs, blade springs, rubbers or the like) can be interposed between the tip ends of the screws 45 and the light exit surface, thereby supporting and securing the tapered rod 12 with substantially constant pressing forces caused by these elastic members. Further, plate members can be interposed therebetween, instead of such elastic members. The polarization conversion devices 40 and the like can be also pressed and supported by the aforementioned screws 45, the aforementioned elastic members or the aforementioned plate members. Further, the opening with the springs illustrated in FIG. 11(d) can be also applied to the first opening 23a. Further, as illustrated in FIG. 13, the fixed-side supporting member 23 can support a prism 41 at its one end. By providing such a prism 41, it is possible to change the illumination optical axis by 90 degree, for example. Also, as illustrated in FIG. 13, similarly, the present invention is not limited to the configuration in which the fixed-side supporting member 23 and the slide supporting member 24 are faced to each other in parallel.

Figure 14:
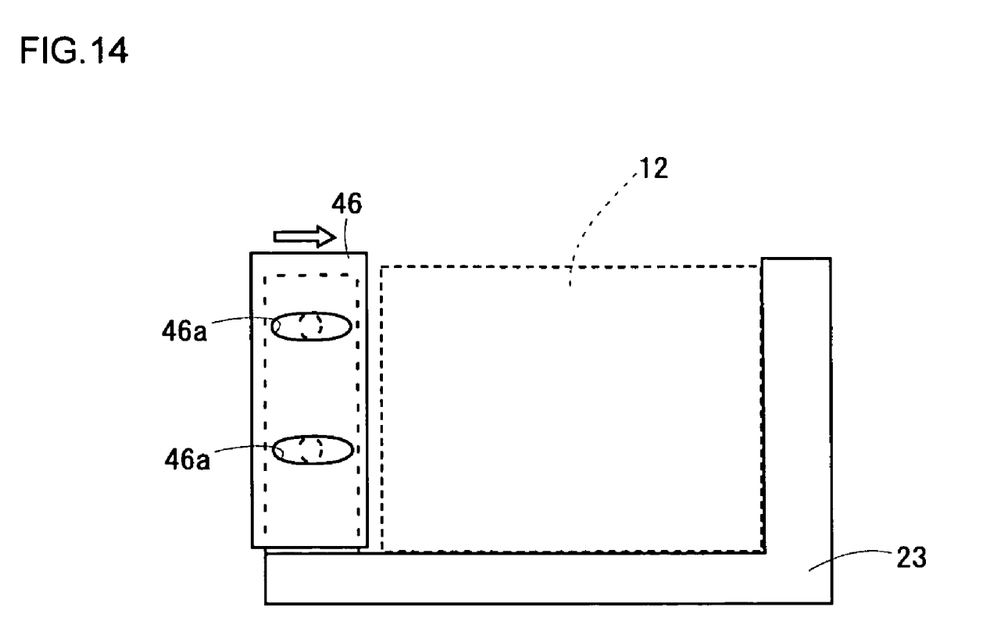
FIG. 14 is an explanation view illustrating another example of the fixed-side supporting member.

Further, the upright portion of the fixed-side supporting member 23 is not limited to a portion having a rectangular frame shape with four sides. For example, as illustrated in FIG. 14, the fixed-side supporting member 23 can be constituted by an angular-U-shaped member and a movable member 46. In FIG. 14, the right-side upright portion and the lower-side portion of the aforementioned angular-U-shaped member function as a positioning reference surface, while the left-side upright portion supports the aforementioned movable member 46. Screw holes are formed in the left-side upright portion. Further, elongate-holes which are long in the lateral direction are formed on the movable member 46. By moving the movable member 46 in the rightward direction in the figure for pressing the light exit surface of the tapered rod 12 at a side portion thereof with the right-side edge of the movable member 46 and by screwing not-shown screws into the aforementioned screw holes through the aforementioned elongate-holes, it is possible to position and hold the light exit surface of the tapered rod 12.

Further, while, in the aforementioned example, the guide concave portion 24b to be guided by the aforementioned guide convex portion 22 is formed at the center of the bottom surface of the base portion of the slide supporting member 24, it is also possible to reverse the convex-and-concave relationship. Also, it is possible to form two or more sets of a guide concave portion 24b and a guide convex portion 22.

Further, while, in the aforementioned example, there has been exemplified a case where the polarization conversion device 40 employing a dielectric multi-layer film is placed, it is possible to use a configuration in which a polarization conversion device employing a wire grid is placed. In this case, the size of the surface of the polarization conversion device employing the wire grid is made equal to or substantially equal to the size of the light exit surface of the tapered rod.

Further, while, in the aforementioned example, there has been described a three-panel projection type video display, the rod integrator holder according to the present application can be applied to a single-panel projection type video display. As a matter of cause, the light valves for modulating light are not limited to transparent-type liquid crystal display panels, but may be reflection-type liquid crystal display panels or light values constituted by plural arranged micromirrors. Also, the larger surface of the tapered rod 12 can be used as a light incidence surface, and the smaller surface thereof can be used as a light exit surface.

Further, in the aforementioned example, as illustrated in FIG. 3, the distance (A) between the supporting point of the fixed-side supporting member 23 for supporting the tapered rod 12 and the supporting point of the slide supporting member 24 is different from the distance (B) between the center points of the screws for securing the fixed-side supporting member 23 to the base plate 21 and the center points of the screws for securing the slide supporting member 24 to the base plate 21 (A>B). In anticipation of expansion of the tapered rod 12 toward the LED (light source) due to thermal expansion thereof, it is desirable to set the respective linear expansion coefficients of the tapered rod 12 and the base plate 21 so that the amount of expansion of the portion of the tapered rod 12 which corresponds to the aforementioned distance A becomes equal to the amount of expansion of the portion of the base plate 21 which corresponds to the aforementioned distance B (for example, their linear expansion coefficients are made different from each other). As a matter of cause, an arrangement that the distance (A) between the aforementioned supporting points is equal to the distance (B) between the aforementioned center points can be employed, in this case the linear expansion coefficients of the tapered rod 12 and the base plate 21 are equal to each other. It is possible to provide a configuration which satisfies the relationship of A<B. If there is a difference between the temperatures of the tapered rod 12 and the base plate 21 during temperature rise, their linear expansion coefficients should be selected in consideration thereof. There is a difference in linear expansion coefficient between a tapered rod 12 made of a transparent glass and a tapered rod 12 made of a transparent resin. Similarly, there is a difference in linear expansion coefficient among a base plate 21 made of a resin, a base plate 21 made of a metal and a base plate 21 made of a ceramic. Further, while, in the aforementioned example, there has been described a projection type video display employing LEDs as light sources, it is also possible to employ laser diodes as light sources.

The present invention has been described in detail with reference to the drawings, the invention has been described using the diagrams and examples and, obviously, the invention is not limited to those. The sprit and scope of the present invention are limited only by the terms in the appended claims.

What is claimed is:

1. A rod integrator holder for positioning and holding a tapered rod integrator having a light incidence surface and a light exit surface, one of which is larger than the other, the rod integrator holder comprising:
    a fixed-side supporting member having a first holding portion with a first opening for positioning and holding said larger surface side thereof;
    a guide portion formed in parallel to an illumination optical axis; and
    a slide supporting member provided movably along said guide portion,
    wherein said slide supporting member has a second holding portion with a second opening corresponding to a shape and a size of a halfway portion of the body portion of said tapered rod integrator, so that the halfway portion of said body portion is positioned and held through said second opening at the position of the halfway portion of said body portion.

2. The rod integrator holder according to claim 1, wherein said fixed-side supporting member holds one end of another rod optical integrator or one end of a prism that changes the optical path by a predetermined angle.

3. The rod integrator holder according to claim 1, wherein said fixed-side supporting member holds a polarization conversion device for aligning a direction of polarization of light emitted from said tapered rod integrator.

4. A projection video display comprising:
    a light source;
    a tapered rod integrator to which light emitted from said light source incidents;
    a rod integrator holder according to any one of claims 1 to 3 for holding said tapered rod integrator;
    a light valve for modulating light directed thereto; and
    a projection portion for projecting image light from said light value.

* * * * *